(12) United States Patent
Howard et al.

(10) Patent No.: US 7,346,115 B2
(45) Date of Patent: Mar. 18, 2008

(54) ITERATIVE EIGENVECTOR COMPUTATION FOR A MIMO COMMUNICATION SYSTEM

(75) Inventors: Steven J. Howard, Ashland, MA (US);
John W. Ketchum, Harvard, MA (US);
Mark S. Wallace, Bedford, MA (US);
Peter Monsen, Wellesley, MA (US); J. Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 835 days.

(21) Appl. No.: 10/830,907

(22) Filed: Apr. 22, 2004

(65) Prior Publication Data

US 2005/0237920 A1    Oct. 27, 2005

(51) Int. Cl.
*H04L 27/28*        (2006.01)
*H04L 1/02*         (2006.01)
(52) U.S. Cl. ........................ 375/260; 375/267
(58) Field of Classification Search ................ 375/260, 375/267, 296, 343; 370/208, 319; 455/450, 455/454
See application file for complete search history.

(56) References Cited

U.S. PATENT DOCUMENTS 6,687,492 B1 * 2/2004 Sugar et al. ............. 455/276.1
2003/0125040 A1 * 7/2003 Walton et al. ............ 455/454
2003/0235255 A1  12/2003 Ketchum et al. ........... 375/285
2004/0165684 A1 *  8/2004 Ketchum et al. .......... 375/343
2004/0209579 A1  10/2004 Vaidyanathan ........... 455/101
2005/0227628 A1 * 10/2005 Inanoglu .................. 455/68

OTHER PUBLICATIONS

Bertrand et al, Optimal Weights Computation of an Emitting Antenna Array-The Obele Algorithm, Jul. 2003, IEEE Transactions on Signal Processing, vol. 51, Issue 7, pp. 1716-1721.*

* cited by examiner

*Primary Examiner*—Mohammed Ghayour
*Assistant Examiner*—Lawrence Williams
(74) *Attorney, Agent, or Firm*—Amin, Turocy & Calvin, LLP

(57) ABSTRACT

A matrix $\hat{V}$ of eigenvectors is derived using an iterative procedure. For the procedure, an eigenmode matrix $V_i$ is first initialized, e.g., to an identity matrix. The eigenmode matrix $V_i$ is then updated based on a channel response matrix $\hat{H}$ for a MIMO channel to obtain an updated eigenmode matrix $V_{i+1}$. The eigenmode matrix may be updated for a fixed or variable number of iterations. The columns of the updated eigenmode matrix may be orthogonalized periodically to improve performance and ensure stability of the iterative procedure. In one embodiment, after completion of all iterations, the updated eigenmode matrix for the last iteration is provided as the matrix $\hat{V}$.

76 Claims, 5 Drawing Sheets

US 7,346,115 B2

ITERATIVE EIGENVECTOR COMPUTATION FOR A MIMO COMMUNICATION SYSTEM

BACKGROUND

I. Field

The present invention relates generally to data communication, and more specifically to techniques for deriving eigenvectors used for spatial processing in a multiple-input multiple-output (MIMO) communication system.

II. Background

A MIMO system employs multiple ($N_T$) transmit antennas and multiple ($N_R$) receive antennas for data transmission. A MIMO channel formed by the $N_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher overall throughput or redundantly to achieve greater reliability.

In general, up to $N_S$ data streams may be transmitted simultaneously from the $N_T$ transmit antennas in the MIMO system. However, these data streams interfere with each other at the receive antennas. Improved performance may be achieved by transmitting data on $N_S$ eigenmodes of the MIMO channel, where the eigenmodes may be viewed as orthogonal spatial channels. To transmit data on the $N_S$ eigenmodes, it is necessary to perform spatial processing at both a transmitter and a receiver. The spatial processing attempts to orthogonalize the data streams so that they can be individually recovered with minimal degradation at the receiver.

For data transmission on the $N_S$ eigenmodes, the transmitter performs spatial processing with a matrix of $N_S$ eigenvectors, one eigenvector for each eigenmode used for data transmission. Each eigenvector contains $N_T$ complex values used to scale a data symbol prior to transmission from the $N_T$ transmit antennas and on the associated eigenmode. For data reception, the receiver performs receiver spatial processing (or spatial matched filtering) with another matrix of $N_S$ eigenvectors. The eigenvectors for the transmitter and the eigenvectors for the receiver may be derived based on a channel response estimate for the MIMO channel between the transmitter and receiver. The derivation of the eigenvectors is computationally intensive. Furthermore, the accuracy of the eigenvectors may have a large impact on performance.

There is therefore a need in the art for techniques to efficiently and accurately derive eigenvectors used for data transmission and reception via the eigenmodes of a MIMO channel.

SUMMARY

Techniques for deriving a matrix $\hat{\underline{V}}$ of eigenvectors using an iterative procedure are described herein. For the iterative procedure, an eigenmode matrix $\underline{V}_i$ is first initialized to, for example, an identity matrix $\underline{I}$ or a matrix of eigenvectors derived for a prior transmission interval. The eigenmode matrix $\underline{V}_i$ is then updated based on a channel response matrix $\hat{\underline{H}}$ for a MIMO channel to obtain an updated eigenmode matrix $\underline{V}_{i+1}$, as described below.

The eigenmode matrix may be updated for (1) a fixed number of iterations (e.g., 10 iterations) or (2) a variable number of iterations until a termination condition is reached. The columns of the updated eigenmode matrix may be orthogonalized periodically or as necessary to improve performance and to ensure stability of the iterative procedure. In one embodiment, after all of the iterations have been completed, the updated eigenmode matrix (or the orthogonalized updated eigenmode matrix) for the last iteration is provided as the matrix $\hat{\underline{V}}$ of eigenvectors. The matrix $\hat{\underline{V}}$ may be used for spatial processing for data transmission on the eigenmodes of the MIMO channel. The matrix $\hat{\underline{V}}$ may also be used to derive a spatial filter matrix used for spatial matched filtering of a data transmission received via the eigenmodes of the MIMO channel.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The eigenvector computation techniques described herein may be used for a single-carrier MIMO system as well as a multi-carrier MIMO system. For clarity, these techniques are described in detail for a single-carrier MIMO system.

A. Single-Carrier MIMO System

Figure 1:
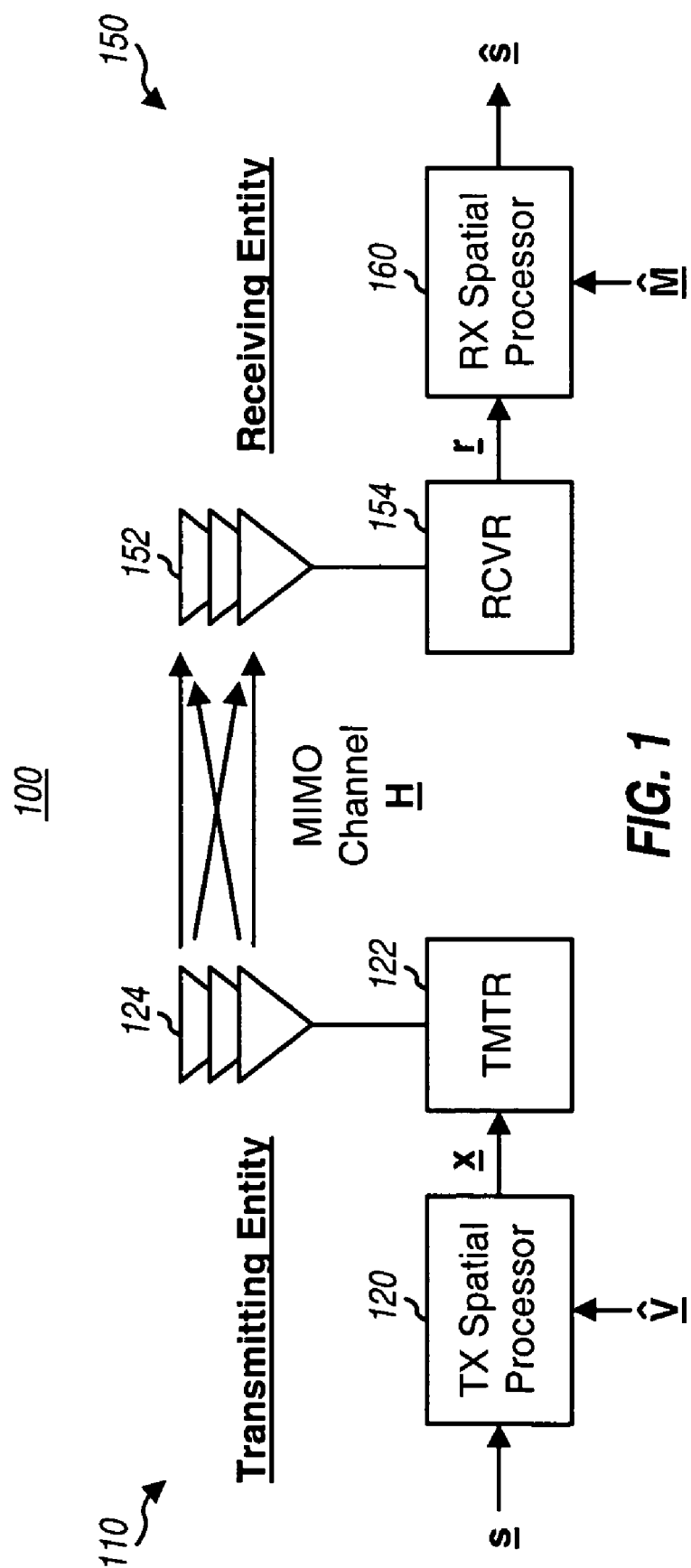
FIG. 1 shows a transmitting entity and a receiving entity in a MIMO system.

FIG. 1 shows a simple block diagram of a transmitting entity 110 and a receiving entity 150 in a single-carrier MIMO system 100. At transmitting entity 110, a transmit (TX) spatial processor 120 performs spatial processing on data symbols (denoted by a vector $\underline{s}$) with a matrix $\hat{\underline{V}}$ of eigenvectors to generate transmit symbols (denoted by a vector $\underline{x}$). As used herein, a "data symbol" is a modulation symbol for data, a "pilot symbol" is a modulation symbol for pilot (which is known a priori by both the transmitting and receiving entities), a "transmit symbol" is a symbol to be sent from a transmit antenna, and a modulation symbol is a complex value for a point in a signal constellation used for a particular modulation scheme (e.g., M-PSK, M-QAM, and so on). The transmit symbols are further conditioned by a transmitter unit (TMTR) 122 to generate $N_T$ modulated signals, which are transmitted from $N_T$ transmit antennas 124 and via a MIMO channel.

At receiving entity 150, the transmitted modulated signals are received by $N_R$ receive antennas 152, and the $N_R$ received signals are conditioned by a receiver unit (RCVR) 154 to obtain received symbols (denoted by a vector $\underline{r}$). A receive (RX) spatial processor 160 then performs receiver spatial processing (or spatial matched filtering) on the received symbols with a spatial filter matrix $\hat{\underline{M}}$ to obtain detected symbols (denoted by a vector $\hat{\underline{s}}$). The detected symbols are estimates of the data symbols sent by transmitting entity 110. The spatial processing at the transmitting and receiving entities are described below.

For the single-carrier MIMO system, the MIMO channel formed by the $N_T$ transmit antennas at the transmitting entity and the $N_R$ receive antennas at the receiving entity may be characterized by an $N_R \times N_T$ channel response matrix $\underline{H}$, which may be expressed as:

$$\underline{H} = \begin{bmatrix} h_{1,1} & h_{1,2} & \ldots & h_{1,N_T} \\ h_{2,1} & h_{2,2} & \ldots & h_{2,N_T} \\ \vdots & \vdots & \ddots & \vdots \\ h_{N_R,1} & h_{N_R,2} & \ldots & h_{N_R,N_T} \end{bmatrix}, \quad \text{Eq (1)}$$

where element $h_{i,j}$, for $i=1 \ldots N_R$ and $j=1 \ldots N_T$, denotes the coupling or complex gain between transmit antenna $j$ and receive antenna $i$. For simplicity, the MIMO channel is assumed to be full rank with $N_S = N_T \leq N_R$.

The channel response matrix $\underline{H}$ may be "diagonalized" to obtain $N_S$ eigenmodes of $\underline{H}$. This diagonalization may be achieved by performing either singular value decomposition of the channel response matrix $\underline{H}$ or eigenvalue decomposition of a correlation matrix of $\underline{H}$, which is $\underline{C} = \underline{H}^H \underline{H}$, where "$^H$", denotes the conjugate transpose.

The singular value decomposition of the channel response matrix $\underline{H}$ may be expressed as:

$$\underline{H} = \underline{U\Sigma V}^H, \quad \text{Eq (2)}$$

where $\underline{U}$ is an $N_R \times N_R$ unitary matrix of left eigenvectors of $\underline{H}$;
$\underline{\Sigma}$ is an $N_R \times N_T$ diagonal matrix of singular values of $\underline{H}$; and
$\underline{V}$ is an $N_T \times N_T$ unitary matrix of right eigenvectors of $\underline{H}$.

A unitary matrix $\underline{M}$ is characterized by the property $\underline{M}^H \underline{M} = \underline{I}$, where $\underline{I}$ is the identity matrix containing ones along the diagonal and zeros elsewhere. The columns of a unitary matrix are orthogonal to one another.

The eigenvalue decomposition of the correlation matrix of $\underline{H}$ may be expressed as:

$$\underline{C} = \underline{H}^H \underline{H} = \underline{V\Lambda V}^H, \quad \text{Eq (3)}$$

where $\underline{\Lambda}$ is an $N_T \times N_T$ diagonal matrix of eigenvalues of $\underline{C}$. As shown in equations (2) and (3), the columns of $\underline{V}$ are right eigenvectors of $\underline{H}$ as well as eigenvectors of $\underline{C}$. Singular value decomposition and eigenvalue decomposition are described by Gilbert Strang in a book entitled "Linear Algebra and Its Applications," Second Edition, Academic Press, 1980.

The right eigenvectors of $\underline{H}$ (which are the columns of $\underline{V}$) may be used for spatial processing by the transmitting entity to transmit data on the $N_S$ eigenmodes of $\underline{H}$. The left eigenvectors of $\underline{H}$ (which are the columns of $\underline{U}$) may be used for spatial matched filtering by the receiving entity to recover the data transmitted on the $N_S$ eigenmodes. The eigenmodes may be viewed as orthogonal spatial channels obtained through decomposition.

A diagonal matrix contains non-negative real values along the diagonal and zeros elsewhere. The diagonal elements of $\underline{\Sigma}$ are referred to as the singular values of $\underline{H}$ and represent the channel gains for the $N_S$ eigenmodes of $\underline{H}$. The diagonal elements of $\underline{\Lambda}$ are referred to as the eigenvalues of $\underline{C}$ and represent the power gains for the $N_S$ eigenmodes of $\underline{H}$. The singular values of $\underline{H}$, which are denoted as $\{\sigma_1, \sigma_2 \ldots \sigma_{N_S}\}$, are thus the square roots of the eigenvalues of $\underline{C}$, which are denoted as $\{\lambda_1, \lambda_2 \ldots \lambda_{N_S}\}$, or $\sigma_i = \sqrt{\lambda_i}$ for $i=1 \ldots N_S$.

B. Iterative Eigenvector Computation

The matrices $\underline{H}$, $\underline{V}$, and $\underline{U}$ represent "true" quantities that are not available in a practical system. Instead, estimates of the matrices $\underline{H}$, $\underline{V}$, and $\underline{U}$ may be obtained and denoted as $\underline{\hat{H}}$, $\underline{\hat{V}}$, and $\underline{\hat{U}}$, respectively. The matrix $\underline{\hat{H}}$ may be obtained, for example, based on a MIMO pilot sent via the MIMO channel. A MIMO pilot is a pilot comprised of $N_T$ pilot transmissions sent from $N_T$ transmit antennas, where the pilot transmission from each transmit antenna is identifiable by the receiving entity. This can be achieved, for example, by using a different orthogonal sequence for the pilot transmission from each transmit antenna. The matrices $\underline{\hat{V}}$ and $\underline{\hat{U}}$ may be efficiently and accurately derived using an iterative procedure.

For the iterative procedure, an $N_T \times N_T$ estimated correlation matrix $\underline{A}$ is initially computed as:

$$\underline{A} = \underline{\hat{H}}^H \underline{\hat{H}}. \quad \text{Eq (4)}$$

The eigenvalue decomposition of $\underline{A}$ would yield $\underline{A} = \underline{V}_a \underline{\Lambda}_a \underline{V}_a^H$, where $\underline{V}_a$ is an estimate of $\underline{V}$ and $\underline{\Lambda}_a$ is an estimate of $\underline{\Lambda}$ due to the fact that $\underline{A}$ is an estimate of $\underline{C}$. An eigenmode matrix $\underline{V}_i$, which is an estimate of $\underline{V}_a$, may be iteratively computed as follows:

$$\underline{V}_{i+1}^H = \underline{V}_i^H + \mu \cdot (\text{Tri\_up}(\underline{V}_i^H \underline{A} \underline{V}_i) - \text{Tri\_low}(\underline{V}_i^H \underline{A} \underline{V}_i)) \underline{V}_i^H, \quad \text{Eq (5)}$$

where $\underline{V}_i$ is the eigenmode matrix for the i-th iteration;
Tri_up ($\underline{M}$) is a matrix containing elements above the diagonal of $\underline{M}$;
Tri_low ($\underline{M}$) is a matrix containing elements below the diagonal of $\underline{M}$;
$\mu$ is a step size for the iterative procedure; and
$\underline{V}_{i+1}$ is the eigenmode matrix for the (i+1)-th iteration.

The eigenmode matrix $\underline{V}_i$ may be initialized to the identity matrix $\underline{I}$, or $\underline{V}_0 = \underline{I}$, if no other information is available for $\underline{V}$. The step size $\mu$ determines the rate of convergence for the iterative procedure. A larger step size speeds up convergence but also increases the granularity of the elements of $\underline{V}_i$. Conversely, a smaller step size results in a slower convergence rate but improves the accuracy of the elements of $\underline{V}_i$. The step size may be set to $\mu=0.05$, for example, or to some other value.

The computation shown in equation (5) may be decomposed into four steps. In one embodiment, for the first step, a matrix $\underline{X}$ is computed as: $\underline{X} = \underline{A}\underline{V}_i$. In the second step, a matrix $\underline{Y}$ is computed as: $\underline{Y} = \underline{V}_i^H \underline{X}$. In the third step, an update matrix $\underline{Z}$ is computed as: $\underline{Z} = (\text{Tri\_up}(\underline{Y}) - \text{Tri\_low}(\underline{Y}))\underline{V}_i$. In the fourth step, the eigenmode matrix is updated as: $\underline{V}_{i+1} = \underline{V}_i + \mu \cdot \underline{Z}$.

Equation (5) may also be expressed as:

$$\underline{V}_{i+1}^H = \underline{V}_i^H + \mu \cdot (\text{Tri\_up}(\underline{V}_i^H \underline{\hat{H}}^H \underline{\hat{H}} \underline{V}_i) - \text{Tri\_low}(\underline{V}_i^H \underline{\hat{H}}^H \underline{\hat{H}} \underline{V}_i))\underline{V}_i^H. \quad \text{Eq (6)}$$

In another embodiment, the matrix $\underline{X}$ is computed as $\underline{X} = \underline{\hat{H}}\underline{V}_i$, the matrix $\underline{Y}$ is computed as $\underline{Y} = \underline{X}^H \underline{X}$, and the matrices $\underline{Z}$ and $\underline{V}_{i+1}$ are computed as described above.

The number of multiply and add operations required for each iteration of equation (5) is dependent on the dimension of the channel response matrix $\underline{\hat{H}}$, which in turn is dependent on the number of transmit antennas and the number of receive antennas. Since all of the matrices defined above, except for the diagonal matrices, contain complex-valued elements, complex multiplies are performed on or for the elements of these matrices. For $N_R=4$ and $N_T=4$, three 4×4 complex matrix multiplies are performed to obtain the three matrices $\underline{X}$, $\underline{Y}$, and $\underline{Z}$. The 4×4 complex matrix multiply for each matrix normally requires four complex multiplies for each element of the matrix, or a total of 64 complex multiplies for the 16 elements of the matrix, which can be performed with 256 real multiplies. A total of 768 real multiplies (where 768=256·3) would then be required to compute the three matrices $\underline{X}$, $\underline{Y}$, and $\underline{Z}$.

Some computational savings may be realized by recognizing that (1) the matrix $\underline{Z}$ contains zeros along the diagonal and (2) the elements below the diagonal of $\underline{Z}$ are the negative of the elements above the diagonal of $\underline{Z}$ (the lower triangle of $\underline{Z}$ is the negative of the upper triangle of $\underline{Z}$). Thus, only 6 out of 16 elements of $\underline{Z}$ need to be computed. This reduces the total number of real multiplies to 608, or 256+256+6·16=608. The multiplies may also be performed in a manner to utilize the full available range. For example, a 4×4 complex matrix multiply for a given matrix may be performed with 256 16×16-bit real multiplies, where the two input operands for each real multiply have 16 bits of resolution and the result of the real multiply has a range that is greater than 16 bits. In this case, the resultant elements of the matrix may be divided by the magnitude of the largest element in the matrix and then multiplied by a scaling factor, which may be selected such that the largest element is represented with a 16-bit value that is as large as possible and/or convenient for processing.

The eigenmode matrix may be iteratively computed as shown in equation (5) for a number of iterations until a sufficiently good estimate of $\underline{V}$ is obtained. It has been found through computer simulation that ten iterations are typically sufficient to obtain a good estimate of $\underline{V}$. In one embodiment, equation (5) is iteratively computed for a fixed number of iterations (e.g., ten iterations) to obtain an eigenmode matrix $\underline{V}_f$, which is the final estimate of $\underline{V}$. In another embodiment, equation (5) is iteratively computed for a variable number of iterations until a termination condition is encountered, and the eigenmode matrix $\underline{V}_f$ for the last iteration is provided as the final estimate of $\underline{\hat{V}}$ provided by the iterative procedure. Since the matrix $\underline{Y}$ should resemble a diagonal matrix, the termination condition may be defined by how closely $\underline{Y}$ resembles a diagonal matrix, as described below.

The iterative procedure updates the eigenmode matrix $\underline{V}_i$ such that $\underline{V}_i^H \underline{A} \underline{V}_i$ approaches a diagonal matrix. The final estimate of $\underline{V}$ may be expressed as:

$$\underline{V}_f^H \underline{A} \underline{V}_f = \underline{D}. \quad \text{Eq (7)}$$

which may be rewritten as:

$$\underline{A} = \underline{V}_f \underline{D} \underline{V}_f^H. \quad \text{Eq (8)}$$

If the iterative procedure is successful, then $\underline{D}$ is approximately equal to $\underline{\Lambda}_a$ (which is the diagonal matrix of eigenvalues of $\underline{A}$) and $\underline{V}_f$ is approximately equal to $\underline{V}_a$ (which is the matrix of eigenvectors of $\underline{A}$). The eigenmode matrix $\underline{V}_f$ is also a good estimate of the matrix $\underline{V}$ of eigenvectors of $\underline{C}$, if $\underline{A}$ is a good estimate of $\underline{C}$.

There are typically some residual errors from the iterative procedure, so that $\underline{V}_f$ is not a true unitary matrix, $\underline{V}_f^H \underline{V}_f$ is not exactly equal to the identity matrix, and the off-diagonal elements of $\underline{D}$ may be non-zero values. Equation (5) may thus be iteratively computed until the off-diagonal elements of $\underline{D}$ are sufficiently small. For example, equation (5) may be iteratively computed until the sum of the squared magnitude of the off-diagonal elements of $\underline{Y}$ is less than a first predetermined threshold. As another example, the computation may continue until the ratio of the sum of the squared magnitude of the diagonal elements of $\underline{Y}$ over the sum of the squared magnitude of the off-diagonal elements of $\underline{Y}$ is greater than a second predetermined threshold. Other termination conditions may also be defined. The columns of $\underline{V}_f$ may also be forced to be orthogonal to one another by performing eigenvector orthogonalization, as described below.

After all of the iterations have been completed, the matrix $\underline{\hat{V}}$ of eigenvectors may be defined as $\underline{\hat{V}} = \underline{V}_f$. The matrix $\underline{\hat{V}}$ is an estimate of the matrix $\underline{V}$, where the estimate is obtained based on $\underline{\hat{H}}$ and using the iterative procedure. The matrix $\underline{\hat{V}}$ may be used for spatial processing, as described below.

Computer simulations have shown that the computation for $\underline{V}_i$ in equation (5) converges for most cases. However, as the number of iterations increases for a given channel response matrix $\underline{\hat{H}}$, residual errors begin accumulating and the solution for $\underline{V}_i$ starts to diverge. Convergence may be assured by performing eigenvector orthogonalization (described below) on the eigenmode matrix $\underline{V}_i$ periodically, e.g., after every $N_{orth}$ iterations, where $N_{orth}$ may be equal to 50 or some other value.

A matrix $\underline{\hat{U}}$, which is an estimate of $\underline{U}$, may also be derived using the iterative procedure, similar to that described above for the matrix $\underline{\hat{V}}$. To derive $\underline{\hat{U}}$, the matrix $\underline{A}$ is defined as $\underline{A} = \underline{\hat{H}} \underline{\hat{H}}^H$, the matrix $\underline{V}_i$ is replaced with a matrix $\underline{U}_i$ in equation (5), and the matrix $\underline{U}_f$ for the last iteration is used as the final estimate of $\underline{U}$, or $\underline{\hat{U}} = \underline{U}_f$. Alternatively, from equation (2), the matrix $\underline{U}$ may be expressed as: $\underline{U} = \underline{H} \underline{V} \underline{\Sigma}^{-1}$. The matrix $\underline{\hat{U}}$ may thus be computed as $\underline{\hat{U}} = \underline{\hat{H}} \underline{\hat{V}} \underline{\hat{\Sigma}}^{-1}$, where $\underline{\hat{H}}$ and $\underline{\hat{\Sigma}}$ may be obtained from the MIMO pilot and $\underline{\hat{V}}$ may be derived using the iterative procedure.

C. Eigenvector Orthogonalization

As noted above, the columns of $\underline{V}_f$ may not be orthogonal to one another if $\underline{D}$ is not a diagonal matrix. This may be due to various parameters such as, for example, the step size μ, the number of iterations computed for $\underline{V}_i$, finite processor precision, and so on. The columns of $\underline{V}_f$ may be forced to be orthogonal to one another using various techniques such as QR factorization, minimum square error computation, and polar decomposition. QR factorization is described in detail below. The orthogonal eigenvectors from the QR factorization are normalized, and the orthonormal eigenvectors are used for spatial processing.

QR factorization decomposes the matrix $\underline{V}_f$ into an orthogonal matrix $\underline{Q}$ and an upper triangle matrix $\underline{R}$. The matrix $\underline{Q}$ forms an orthogonal basis for the columns of $\underline{V}_f$, and the diagonal elements of $\underline{R}$ give the length of the components of the columns of $\underline{V}_f$ in the directions of the respective columns of $\underline{Q}$. The matrices $\underline{Q}$ and $\underline{R}$ may be used to derive an enhanced matrix $\underline{\hat{V}}$ having orthogonal columns.

The QR factorization may be performed using various methods, including a Gram-Schmidt procedure, a householder transformation, and so on. The Gram-Schmidt procedure is recursive and may be numerically unstable. Various variants of the Gram-Schmidt procedure have been devised and are known in the art. The "classical" Gram-Schmidt procedure for orthogonalizing the matrix $\underline{V}_f$ is described below.

For QR factorization, the matrix $\underline{V}_f$ may be expressed as:

$$\underline{V}_f = \underline{Q} \underline{R}. \quad \text{Eq (9)}$$

where $Q$ is an $N_T \times N_T$ orthogonal matrix; and
$R$ is an $N_T \times N_T$ upper triangle matrix with possible non-zero values along and above the diagonal and zeros below the diagonal.

The Gram-Schmidt procedure generates the matrices $Q$ and $R$ column by column. The following notations are used for the description below:

i is an index for the rows of a matrix;
j is an index for the columns of a matrix;
$Q = [q_1 \; q_2 \; \ldots \; q_{N_T}]$, where $q_j$ is the j-th column of $Q$;
$q_{i,j}$ is the element in the i-th row and j-th column of $Q$;
$\tilde{Q} = [\tilde{q}_1 \; \tilde{q}_2 \; \ldots \; \tilde{q}_{N_T}]$, where $\tilde{q}_j$ is the j-th column of $\tilde{Q}$;
$r_{i,j}$ is the element in the i-th row and j-th column of $R$;
$V_f = [v_1 \; v_2 \; \ldots \; v_{N_T}]$, where $v_j$ is the j-th column of $V_f$; and
$v_{i,j}$ is the element in the i-th row and j-th column of $V_f$.

The first column of $Q$ and $R$ may be obtained as follows:

$$r_{1,1} = \|v_1\| = \left[\sum_{i=1}^{N_T} |v_{i,1}|^2\right]^{1/2}, \text{ and} \quad \text{Eq (10)}$$

$$q_1 = \frac{1}{r_{1,1}} v_1. \quad \text{Eq (11)}$$

The first column of $R$ includes one non-zero value for the element $r_{1,1}$ in the first row and zeros elsewhere, where $r_{1,1}$ is equal to the 2-norm of $v_1$. The first column of $Q$ is a normalized version of the first column of $V_f$, where the normalization is achieved by scaling each element of $v_1$ with the inverse of $r_{1,1}$.

Each of the remaining columns of $Q$ and $R$ may be obtained as follows:

FOR j = 2, 3, ... $N_T$ {
  FOR i = 1, 2, ... j – 1 {
    $r_{i,j} = q_i^H v_j$ }    Eq (12)

$$\tilde{q}_j = v_j - \sum_{i=1}^{j-1} r_{i,j} \cdot q_i \quad \text{Eq (13)}$$

$$r_{j,j} = \|\tilde{q}_j\| \quad \text{Eq (14)}$$

$$q_j = \frac{1}{r_{j,j}} \cdot \tilde{q}_j \} \quad \text{Eq (15)}$$

The Gram-Schmidt procedure generates one column at a time for $Q$. Each new column of $Q$ is forced to be orthogonal to all prior-generated columns to the left of the new column. This is achieved by equations (13) and (15), where the j-th column of $Q$ (or $q_j$) is generated based on $\tilde{q}_j$, which in turn is generated based on the j-th column of $V_f$ (or $v_j$) and subtracting out any components in $v_j$ pointing in the direction of the other j-1 columns to the left of $v_j$. The diagonal elements of $R$ are computed as the 2-norm of the columns of $\tilde{Q}$ (where $\tilde{q}_1 = v_1$), as shown in equation (14).

Improved performance may be obtained by ordering the columns of $V_f$ based on the diagonal elements of $D$ prior to performing the QR factorization. The diagonal elements of $D$ may be ordered such that $\{d_1 \geq d_2 \geq \ldots \geq d_{N_T}\}$, where $d_1$ is the largest and $d_{N_T}$ is the smallest diagonal element of $D$. When the diagonal elements of $D$ are ordered, the columns of $V_f$ are also ordered correspondingly. The first or left-most column of the ordered $V_f$ would then be associated with the largest diagonal element of $D$, and the last or right-most column of the ordered $V_f$ would be associated with the smallest diagonal element of $D$.

If the columns of $V_f$ are ordered based on decreasing values of their associated diagonal elements, then the columns/eigenvectors of $Q$ are forced to be orthogonal to the first column/eigenvector, which is associated with the largest diagonal element and has the largest gain. The ordering thus has a beneficial effect of rejecting certain noise components of each of the remaining eigenvectors of $Q$. In particular, the j-th column of $Q$ (or $q_j$) is generated based on the j-th column of $V_f$ (or $v_j$), and noise components in $v_j$ that point in the direction of the j–1 eigenvectors to the left of $q_j$ (which are associated with higher gains) are subtracted from $v_j$ to obtain $q_j$. The ordering also has another beneficial effect of improving the estimates of eigenvectors associated with smaller diagonal elements. The overall result is improved performance, especially if the orthogonalized eigenvectors of $Q$ are used for spatial processing.

The enhanced matrix $\hat{V}$ from the QR factorization may be expressed as:

$$\hat{V} = Q\tilde{R} \quad \text{Eq (16)}$$

where $\tilde{R}$ is a diagonal matrix that contains only the diagonal elements of $R$. The matrix $\hat{V}$ may be set equal to the enhanced matrix $\tilde{V}$, or $\hat{V} = \tilde{V}$.

Figure 2:
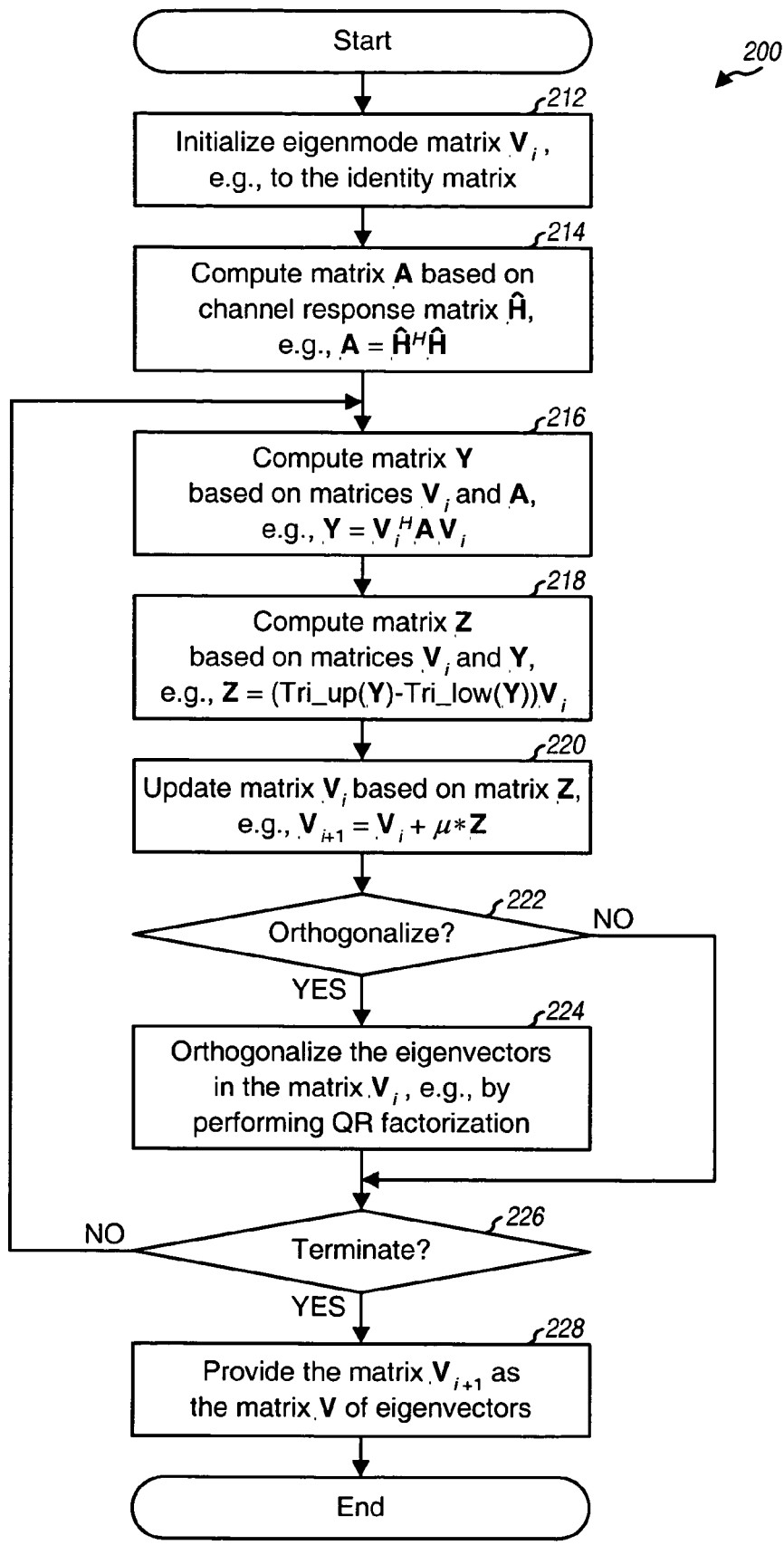
FIG. 2 shows an iterative procedure for deriving a matrix of eigenvectors.

FIG. 2 shows a flow diagram of an iterative process 200 for deriving the matrix $\hat{V}$ of eigenvectors. The eigenmode matrix $V_i$ is first initialized, e.g., to the identity matrix or to a matrix of eigenvectors derived for another transmission interval or another subband (block 212). The matrix $A$ is computed based on the channel response matrix $\hat{H}$, e.g., as shown in equation (4) (block 214).

The eigenmode matrix $V_i$ is then iteratively computed for a number of iterations. For each iteration, the matrix $Y$ is first computed based on the matrices $V_i$ and $A$, e.g., $Y = V_i^H A V_i$ (block 216). The update matrix $Z$ is then computed based on the matrices $V_i$ and $Y$, e.g., $Z = (\text{Tri\_up}(Y) - \text{Tri\_low}(Y))V_i$ (block 218). Blocks 216 and 218 represent one way to obtain the update matrix $Z$. The eigenmode matrix is then updated based on the matrix $Z$, e.g., $V_{i+1} = V_i + \mu \cdot Z$ (block 220).

A determination is next made whether to orthogonalize the eigenvectors in the eigenmode matrix (block 222). Orthogonalization may be performed, for example, if $N_{orth}$ iterations have been completed since the start of the iterative procedure or since the last eigenvector orthogonalization. If the answer is 'yes' for block 222, then eigenvector orthogonalization is performed to obtain orthogonal columns for the eigenmode matrix (block 224). Otherwise, if the answer is 'no', then block 224 is skipped. In any case, a determination is next made whether or not to terminate the iterative procedure (block 226). The procedure may be terminated, e.g., after a fixed number of iterations or if a termination condition is encountered. If the answer is 'no' for block 226, then the process returns to block 216 to perform another iteration. Otherwise, the eigenmode matrix $V_f$ for the last iteration is provided as the matrix $\hat{V}$ of eigenvectors (block 228), and the process terminates. Although not shown in FIG. 2, eigenvector orthogonalization may be performed on $V_f$, and the enhanced matrix $\hat{V}$ with orthogonal columns may be provided as the matrix $\hat{V}$.

D. Spatial Processing

The channel estimation and eigenvector computation may be performed in various manners. For example, referring to FIG. 1, the receiving entity can receive a MIMO pilot from the transmitting entity, obtain the channel response matrix $\tilde{H}$ based on the MIMO pilot, derive the matrix $\tilde{V}$ of eigenvectors based on $\tilde{H}$ and using the iterative procedure, and derive a spatial filter matrix $\hat{M}$ based on $\hat{V}$ and $\hat{H}$. The receiving entity can send $\tilde{V}$ back to the transmitting entity.

The transmitting entity performs spatial processing for data transmission on the $N_S$ eigenmodes, as follows:

$$\underline{x}=\hat{V}\underline{s}, \qquad \text{Eq (17)}$$

where $\underline{s}$ is an $N_T \times 1$ vector with up to $N_S$ data symbols to be sent on the $N_S$ eigenmodes in one symbol period; and $\underline{x}$ is an $N_T \times 1$ vector with $N_T$ transmit symbols to be sent from the $N_T$ transmit antennas in one symbol period.

The eigenvectors in $\hat{V}$ are also referred to as transmit vectors or steering vectors.

The received symbols at the receiving entity may be expressed as:

$$\underline{r}=\underline{H}\underline{x}+\underline{n}, \qquad \text{Eq (18)}$$

where $\underline{r}$ is an $N_R \times 1$ vector with $N_R$ received symbols obtained via the $N_R$ receive antennas, and $\underline{n}$ is a noise vector.

The receiving entity may perform spatial matched filtering, as follows:

$$\hat{\underline{s}}=\hat{\Lambda}^{-1}\hat{M}\hat{r}=\hat{\Lambda}^{-1}\hat{V}^H\hat{H}^H(\underline{H}\hat{V}\underline{s}+\underline{n})\approx\underline{s}+\underline{n}', \qquad \text{Eq (19)}$$

where $\hat{\underline{s}}$ is an $N_T \times 1$ vector with $N_T$ detected symbols;

$\hat{M}$ is an $N_T \times N_R$ spatial filter matrix, which is $\hat{M}=\hat{V}$ $\underline{n}'$ is a post-detection noise vector.

As shown in equation (19), the receiving entity can recover the transmitted data symbols by performing spatial matched filtering with $\hat{M}$ and then scaling with $\hat{\Lambda}^{-1}$ to obtain the detected symbols. If $\hat{H}$ is a good estimate of $\underline{H}$ and $\hat{V}$ is a good estimate of $\underline{V}$, then $\hat{\underline{s}}$ is a good estimate of $\underline{s}$ in the absence of noise.

For simplicity, the above description assumes a full rank MIMO channel with $N_S=N_T \leq N_R$. The MIMO channel may be rank deficient so that $N_S<N_T \leq N_R$, or the number of receive antennas may be less than the number of transmit antennas so that $N_S \leq N_R<N_T$. For both of these cases, the $N_T \times 1$ vector $\underline{s}$ would contain non-zero values for the first $N_S$ elements and zeros for the remaining $N_T-N_S$ elements, and the $N_T \times 1$ vector $\hat{\underline{s}}$ would contain $N_S$ detected symbols for the first $N_S$ elements. Alternatively, the vector $\underline{s}$ may have a dimension of $N_S \times 1$, the matrix $\hat{V}$ may have a dimension of $N_T \times N_S$, and the spatial filter matrix $\hat{M}$ may have a dimension of $N_S \times N_T$.

E. Channel Estimation

Data may be transmitted in various manners in the MIMO system. For a burst mode, data is transmitted in a small number of frames (e.g., one frame). A frame may be defined as a transmission interval of a predetermined time duration (e.g., 2 msec). The channel estimation is then performed based on the pilot received in a limited number of frames. For a continuous mode, data is transmitted in a larger number of frames, either continuously or with small gaps in transmission. The channel estimation may then be performed based on the pilot received in multiple frames.

The receiving entity can estimate the MIMO channel response for each frame n based on the pilot received in that frame and obtain a channel response matrix $\hat{H}(n)$ for that frame. To improve the quality of the channel estimate, the receiving entity can filter the channel response matrices obtained for the current and prior frames using a finite impulse response (FIR) filter, an infinite impulse response (IIR) filter, or some other type of filter. The filtering is performed on each of the elements in the channel response matrix and provides a filtered channel response matrix $\tilde{H}(n)$. For example, the filtering of the channel response matrices for multiple frames with a single-tap IIR filter may be expressed as:

$$\tilde{h}_{i,j}(n)=\alpha \cdot \tilde{h}_{i,j}(n-1)+(1-\alpha)\cdot \hat{h}_{i,j}(n), \text{ for } i=1 \ldots N_R \text{ and} \\ j=1 \ldots N_T, \qquad \text{Eq (20)}$$

where $\tilde{h}_{i,j}(n)$ is the element in the i-th row and j-th column of $\tilde{H}(n)$ for frame n;

$\tilde{h}_{i,j}(n-1)$ is the (i,j)-th element of $\tilde{H}(n-1)$ for frame n−1;

$\hat{h}_{i,j}(n)$ is the (i,j)-th element of $\hat{H}(n)$ for frame n; and $\alpha$ is a coefficient for the IIR filter.

A larger value for $\alpha$ gives greater weight to the prior channel estimates, and a smaller value for $\alpha$ gives greater weight to the current channel estimate. The coefficient $\alpha$ may be set as $\alpha=0.75$, for example, or to some other value.

The eigenvector computation may be performed for each frame n based on either the unfiltered channel response matrix $\hat{H}(n)$ or the filtered channel response matrix $\tilde{H}(n)$ obtained for that frame. For each frame, the eigenmode matrix $\underline{V}_i$ may be initialized to either the identity matrix or the matrix $\hat{V}(n-1)$ of eigenvectors obtained for a prior frame. The eigenvector computation for each frame provides the matrix $\hat{V}(n)$ of eigenvectors that can be used for spatial processing in that frame.

The eigenvector orthogonalization may be performed in various manners, which may be dependent on whether data is transmitted using the burst mode or the continuous mode. In one embodiment for both modes, eigenvector orthogonalization is performed on the eigenmode matrix $\underline{V}_f$ for the last iteration, and the matrix $\hat{V}(n)$ is set to the enhanced matrix $\tilde{V}$ having orthogonal columns. In another embodiment for the burst mode, eigenvector orthogonalization is not performed, and the matrix $\hat{V}(n)$ is simply set to the eigenmode matrix $\underline{V}_f$. In another embodiment for the continuous mode, eigenvector orthogonalization is performed after every $N_{fr}$ frames, where $N_{fr}$ may be set to $N_{fr}=5$, for example, or to some other value. If filtering is performed on the channel response matrices, then eigenvector orthogonalization may be performed periodically to ensure stability of the iterative procedure. In general, eigenvector orthogonalization may improve performance and stability but require computation. Eigenvector orthogonalization may thus be performed sparingly or as necessary to reduce the amount of computation required to derive $\hat{V}(n)$.

F. Multi-Carrier MIMO System

The eigenvector computation techniques described herein may also be used for a multi-carrier MIMO system. Multiple carriers may be obtained with orthogonal frequency division multiplexing (OFDM), some other multi-carrier modulation techniques, or some other construct. OFDM effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data.

For a multi-carrier MIMO system, the eigenvector computation may be performed for each subband used for data transmission (or each "data" subband). A channel response matrix $\hat{H}(k)$ may be obtained for each data subband k based on, e.g., a MIMO pilot received on that subband. Eigenvector computation may be performed on $\hat{H}(k)$ for each data subband k to obtain a matrix $\hat{\underline{V}}(k)$ of eigenvectors that may be used for spatial processing for that subband. A high degree of correlation may exist in the channel response matrices for nearby subbands, especially for a flat fading MIMO channel. The eigenvector computation may be performed in a manner to take advantage of this correlation. For example, the eigenmode matrix $\underline{V}_i(k)$ for each data subband may be initialized to the matrix of eigenvectors obtained for an adjacent subband, e.g., $\underline{V}_i(k)=\hat{\underline{V}}(k-1)$ or $\underline{V}_i(k)=\hat{\underline{V}}(k+1)$. As another example, a first set of matrices of eigenvectors may be iteratively derived for a first set of subbands, and a second set of matrices of eigenvectors for a second set of subbands may be derived by interpolating the matrices in the first set.

G. System

Figure 3:
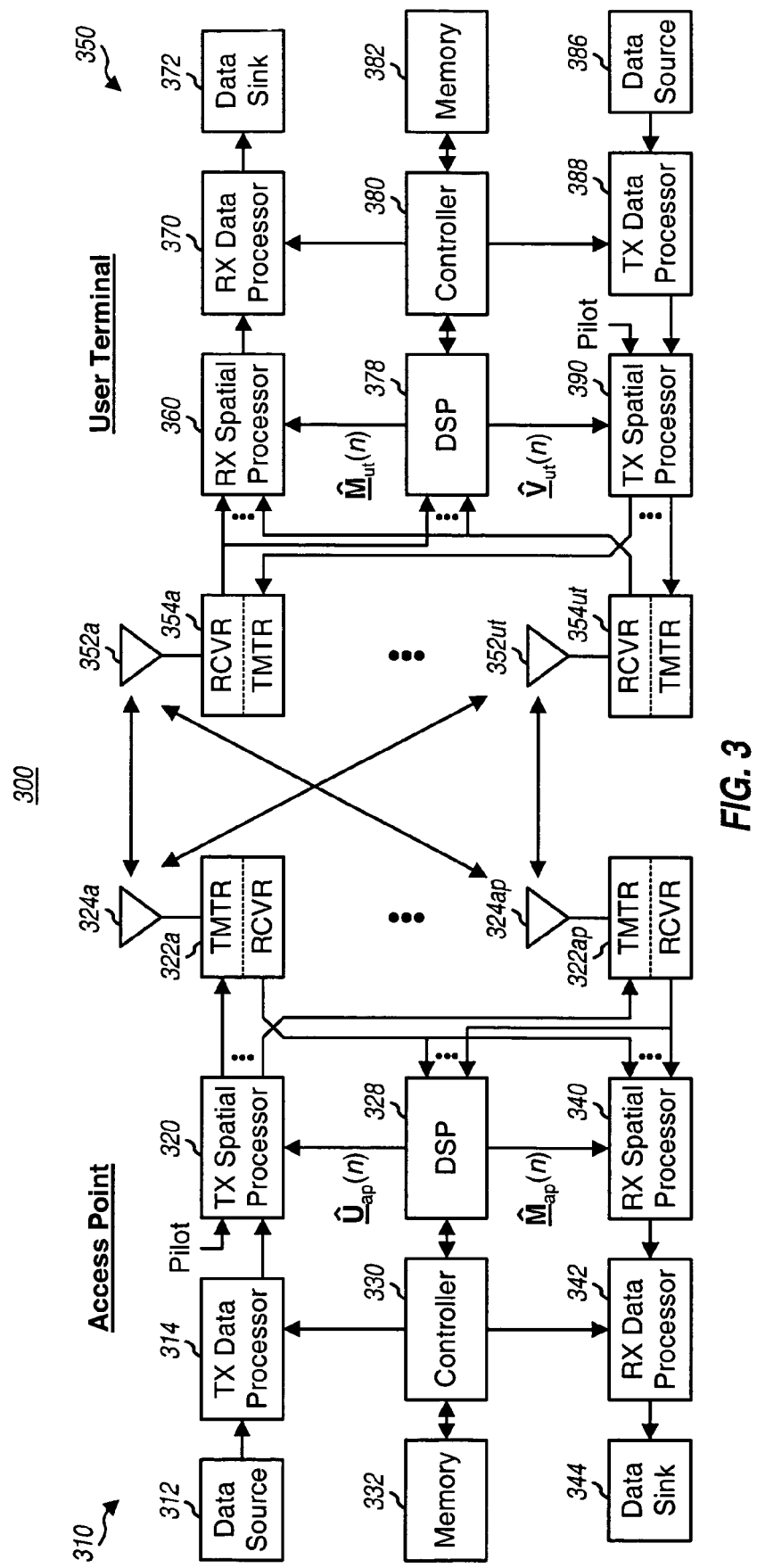
FIG. 3 shows an access point and a user terminal in the MIMO system.

FIG. 3 shows a block diagram of an embodiment of an access point 310 and a user terminal 350 in a MIMO system 300. Access point 310 is equipped with $N_{ap}$ antennas that may be used for data transmission and reception, and user terminal 350 is equipped with $N_{ut}$ antennas, where $N_{ap}>1$ and $N_{ut}>1$.

On the downlink, at access point 310, a TX data processor 314 receives traffic data from a data source 312 and signaling and other data from a controller 330. TX data processor 314 formats, codes, interleaves, and modulates (or symbol maps) the different types of data and provides data symbols. A TX spatial processor 320 receives the data symbols from TX data processor 314, performs spatial processing on the data symbols with one or more matrices of eigenvectors for the downlink (e.g., as shown in equation (17)), multiplexes in pilot symbols as appropriate, and provides $N_{ap}$ streams of transmit symbols to $N_{ap}$ transmitter units 322a through 322ap. Each transmitter unit 322 receives and processes a respective transmit symbol stream and provides a corresponding downlink modulated signal. $N_{ap}$ downlink modulated signals from transmitter units 322a through 322ap are then transmitted from $N_{ap}$ antennas 324a through 324ap, respectively.

At user terminal 350, $N_{ut}$ antennas 352a through 352ut receive the transmitted downlink modulated signals, and each antenna provides a received signal to a respective receiver unit 354. Each receiver unit 354 performs processing complementary to that performed by receiver unit 322 and provides received symbols. An RX spatial processor 360 then performs spatial matched filtering on the received symbols from all $N_{ut}$ receiver units 354a through 354ut (e.g., as shown in equation (20)) to obtain detected symbols. An RX data processor 370 processes (e.g., symbol demaps, deinterleaves, and decodes) the detected symbols and provides decoded data to a data sink 372 for storage and/or a controller 380 for further processing.

The processing for the uplink may be the same or different from the processing for the downlink. Data and signaling are processed (e.g., coded, interleaved, and modulated) by a TX data processor 388, spatially processed by a TX spatial processor 390 with one or more matrices of eigenvectors for the uplink, and multiplexed with pilot symbols to generate $N_{ut}$ transmit symbol streams. $N_{ut}$ transmitter units 354a through 354ut further condition the $N_{ut}$ transmit symbol streams to generate $N_{ut}$ uplink modulated signals, which are then transmitted via $N_{ut}$ antennas 352a through 352ut.

At access point 310, the uplink modulated signals are received by $N_{ap}$ antennas 324a through 324ap and processed by $N_{ap}$ receiver units 322a through 322ap to obtain received symbols for the uplink. An RX spatial processor 340 performs spatial matched filtering on the received symbols and provides detected symbols, which are further processed by an RX data processor 342 to obtain decoded data for the uplink.

Digital signal processors (DSPs) 328 and 378 perform channel estimation and eigenvector computation for the access point and user terminal, respectively. Controllers 330 and 380 control the operation of various processing units at the access point and user terminal, respectively. Memory units 332 and 382 store data and program codes used by controllers 330 and 380, respectively.

Figure 4:
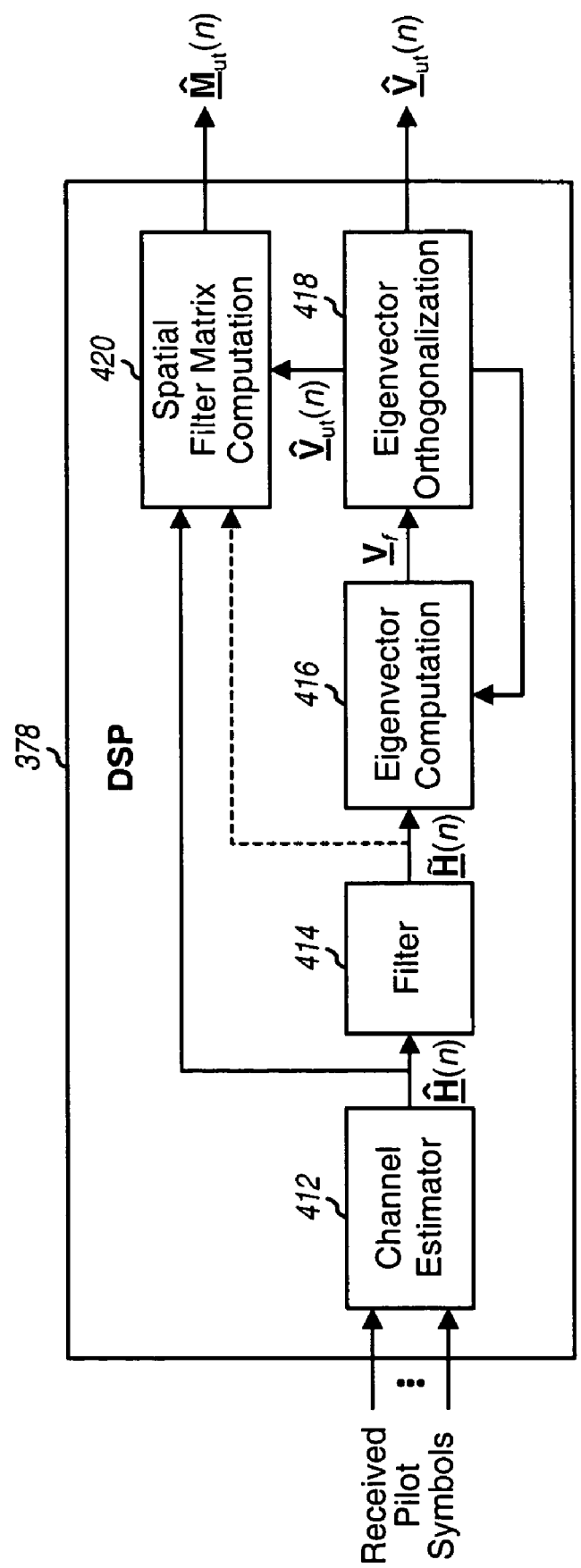
FIG. 4 shows a processor for channel estimation and eigenvector computation.

FIG. 4 shows an embodiment of DSP 378, which performs channel estimation and eigenvector computation for the user terminal. A channel estimator 412 obtains received pilot symbols (which are received symbols for a MIMO pilot sent on the downlink) and derives a channel response matrix $\hat{\underline{H}}(n)$ for the current frame n. A filter 414 performs time-domain filtering of the channel response matrices for the current and prior frames, e.g., as shown in equation (21), and provides a filtered channel response matrix $\tilde{\underline{H}}(n)$ for the current frame. An eigenvector computation unit 416 derives an eigenmode matrix $\underline{V}_f(n)$ for the current frame based on either the unfiltered matrix $\hat{\underline{H}}(n)$ or the filtered matrix $\tilde{\underline{H}}(n)$ and using the iterative procedure, as described above. A unit 418 performs eigenvector orthogonalization on $\underline{V}_f(n)$, if enabled, and provides the matrix $\hat{\underline{V}}(n)$ of eigenvectors for the current frame. Unit 418 may skip the eigenvector orthogonalization and provide the matrix $\hat{V}_f(n)$ from unit 416 directly as the matrix $\hat{\underline{V}}(n)$. This may be the case, for example, for the burst mode, or if less than $N_{fr}$ frames have elapsed since the last orthogonalization for the continuous mode. Unit 418 may also perform the eigenvector orthogonalization and provide an enhance matrix $\tilde{\underline{V}}(n)$ with orthogonal columns as the matrix $\hat{\underline{V}}(n)$. Units 416 and 418 may also pass their results back and forth multiple times for the current frame. In any case, the matrix $\hat{\underline{V}}(n)$ may be sent back to the access point and used for spatial processing for downlink data transmission. A unit 420 derives a spatial matched filter $\hat{\underline{M}}_{ut}(n)$ for the user terminal based on the matrix $\hat{\underline{V}}(n)$ and either the unfiltered matrix $\hat{\underline{H}}(n)$ or the filtered matrix $\tilde{\underline{H}}(n)$, e.g., $\hat{\underline{M}}_{ut}(n)=\hat{\underline{V}}^H(n)\hat{\underline{H}}^H(n)$ or $\hat{\underline{M}}_{ut}(n)=\hat{\underline{V}}^H(n)\tilde{\underline{H}}^H(n)$.

FIG. 4 shows a representation of the processing units for channel estimation and eigenvector computation. The processing by the various units in FIG. 4 may be performed, for example, in a time division multiplex (TDM) manner by shared multipliers and adders within DSP 378.

DSP 328 performs channel estimation and eigenvector computation for the access point. The processing by DSP 328 may be the same or different from the processing by DSP 378, depending on the channel structure and pilot transmission scheme used for the MIMO system.

System 300 may utilize a frequency division duplex (FDD) or a time division duplex (TDD) channel structure. For the FDD structure, the downlink and uplink are allocated separate frequency bands, and the channel response matrix for one link may not correlate well with the channel response matrix for the other link. In this case, the channel estimation and eigenvector computation may be performed separately for each link. For the TDD structure, the downlink and uplink share the same frequency band, with the downlink being allocated a portion of the time and the uplink being allocated the remaining portion of the time. The channel response matrix for one link may be highly correlated with the channel response matrix for the other link. In this case, the channel estimation and eigenvector computation may be performed in a manner to take advantage of this correlation, as described below.

Figure 5:
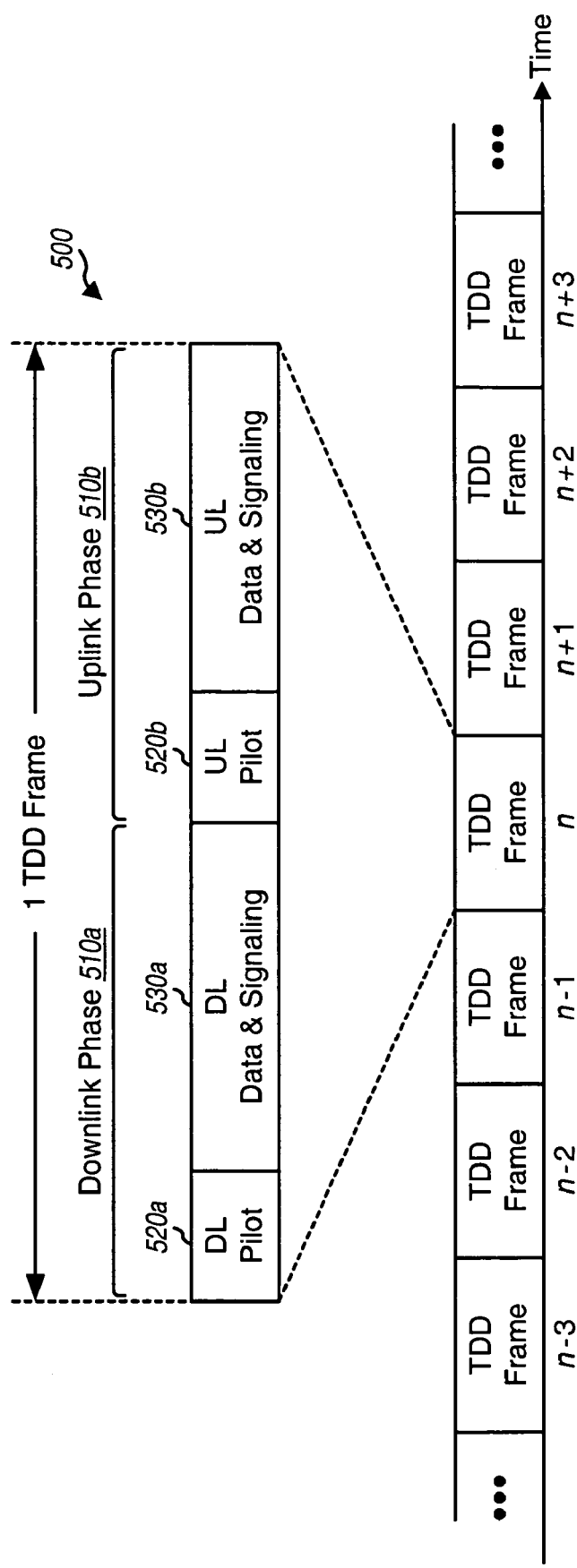
FIG. 5 shows an example TDD frame structure for the MIMO system.

FIG. 5 shows an example frame structure 500 that may be used for a TDD MIMO system. Data transmission occurs in units of TDD frames, with each TDD frame covering a predetermined time duration (e.g., 2 msec). Each TDD frame is partitioned into a downlink phase 510a and an uplink phase 510b. Each phase 510 includes a pilot portion 520 and a data and signaling portion 530. Pilot portion 520 for each link is used to transmit one or more types of pilot, which may be used to estimate the MIMO channel response or the eigenvectors for that link. Data and signaling portion 530 for each link is used to transmit data and signaling. Each phase 510 may include multiple pilot portions 520 and/or multiple data and signaling portions 530, but this is not shown in FIG. 5 for simplicity.

For a TDD MIMO system, the downlink and uplink channel responses may be assumed to be reciprocal of one another. That is, if $\underline{H}$ represents the channel response matrix from antenna array A to antenna array B, then a reciprocal channel implies that the coupling from array B to array A is given by $\underline{H}^T$, where "$^T$" denotes the transpose. Typically, the responses of the transmit and receive chains at the access point are not equal to the responses of the transmit and receive chains at the user terminal. Calibration may be performed to determine and account for the differences in the transmit/receive responses at the two entities. For simplicity, the following description assumes that the transmit and receive chains at the access point and user terminal are flat, $\underline{H}$ is the channel response matrix for the downlink, and $\underline{H}^T$ is the channel response matrix for the uplink. The channel estimation and eigenvector computation may be simplified for a reciprocal channel.

For a reciprocal MIMO channel, the singular value decomposition for the downlink and uplink may be expressed as:

$$\underline{H}^T = \underline{U}_{ap} \underline{\Sigma} \underline{V}^H_{ut} \text{ (uplink), and} \qquad \text{Eq (21)}$$

$$\underline{H} = \underline{V}^*_{ut} \underline{\Sigma}^T \underline{U}^T_{ap} \text{ (downlink),} \qquad \text{Eq (22)}$$

where $\underline{U}_{ap}$ is an $N_{ap} \times N_{ap}$ unitary matrix of left eigenvectors of $\underline{H}^T$,
$\underline{\Sigma}$ is an $N_{ap} \times N_{ut}$ diagonal matrix of singular values of $\underline{H}^T$,
$\underline{V}_{ut}$ is an $N_{ut} \times N_{ut}$ unitary matrix of right eigenvectors of $\underline{H}^T$, and
"*" denotes the complex conjugate.

The matrices $\underline{V}^*_{ut}$ and $\underline{U}^*_{ap}$ are also matrices of left and right eigenvectors, respectively, of $\underline{H}$. The matrices $\underline{U}_{ap}$ and $\underline{V}_{ut}$ may be used by the access point and user terminal, respectively, for spatial processing for both data transmission and reception and are denoted as such by their subscripts.

The channel estimation and eigenvector computation may be performed in various manners for the TDD MIMO system. In one embodiment, the access point transmits a MIMO pilot on the downlink. The user terminal estimates the MIMO channel response based on the downlink MIMO pilot and obtains the channel response matrix $\hat{\underline{H}}$ for the downlink. The user terminal then performs decomposition of $\hat{\underline{H}}^T$ using the iterative procedure described above and obtains $\hat{\underline{V}}_{ut}$, which is an estimate of the matrix $\underline{V}_{ut}$ of right eigenvectors of $\underline{H}^T$. The user terminal uses the matrix $\hat{\underline{V}}_{ut}$ for both (1) spatial processing for an uplink data transmission to the access point and (2) spatial matched filtering of a downlink data transmission from the access point. The user terminal transmits a steered reference on the uplink using $\hat{\underline{V}}_{ut}$. A steered reference (or steered pilot) is a pilot that is transmitted from all antennas and on the eigenmodes of the MIMO channel. The access point derives $\hat{\underline{U}}_{ap}$, which is an estimate of $\underline{U}_{ap}$, based on the uplink steered reference sent by the user terminal. The access point then uses the matrix $\hat{\underline{U}}_{ap}$ for both (1) spatial processing for the downlink data transmission to the user terminal and (2) spatial matched filtering of the uplink data transmission from the user terminal. With a reciprocal channel, the MIMO pilot may be sent on only one link (e.g., the downlink), and the eigenvector computation may be performed by only one entity (e.g., the user terminal) to derive matrices of eigenvectors used by both entities.

System 300 may or may not utilize OFDM for data transmission. If system 300 utilizes OFDM, then $N_F$ total subbands are available for transmission. Of the $N_F$ total subbands, $N_D$ subbands may be used for data transmission and are referred to as data subbands, $N_P$ subbands may be used for a carrier pilot and are referred to as pilot subbands, and $N_G$ subbands may be used as guard subbands (no transmission), where $N_F = N_D + N_P + N_G$. In each OFDM symbol period, up to $N_D$ data symbols may be sent on the $N_D$ data subbands, and up to $N_P$ pilot symbols may be sent on the $N_P$ pilot subbands. For OFDM modulation, $N_F$ frequency-domain values (for $N_D$ data symbols, $N_P$ pilot symbols, and $N_G$ zeros) are transformed to the time domain with an $N_F$-point inverse fast Fourier transform (IFFT) to obtain a "transformed" symbol that contains $N_F$ time-domain chips. To combat intersymbol interference (ISI), which is caused by frequency selective fading, a portion of each transformed symbol is repeated to form a corresponding OFDM symbol. The repeated portion is often referred to as a cyclic prefix or guard interval. An OFDM symbol period (which is also referred to as simply a "symbol period") is the duration of one OFDM symbol. In FIG. 3, the OFDM modulation for each transmit antenna may be performed by the transmitter unit for that antenna. The complementary OFDM demodulation for each receive antenna may be performed by the receiver unit for that antenna.

The eigenvector computation techniques described herein may be implemented by various means. For example, these techniques may be implemented in hardware, software, or a combination thereof. For a hardware implementation, the processing units used to perform the eigenvector computation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the eigenvector computation techniques may be implemented with modules (e.g., procedures, functions, and so on) that perform the functions described herein. The software codes may be stored in a memory unit (e.g., memory unit 332 or 382 in FIG. 3) and executed by a processor (e.g., DSP 328 or 378, or controller 330 or 380). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for computation of eigenvectors in a multiple-input multiple-output (MIMO) communication system, comprising:
   initializing a first matrix of eigenvectors; and
   updating the first matrix based on a channel response matrix for a MIMO channel, wherein the first matrix is updated for a plurality of iterations, and wherein eigenvectors in the updated first matrix are used for spatial processing to transmit data via the MIMO channel.

2. The method of claim 1, wherein the updating of the first matrix is based on the following equation:

$$\underline{V}_{i+1}^H = \underline{V}_i^H + \mu \cdot (\text{Tri\_up}(\underline{V}_i^H \hat{\underline{H}}^H \hat{\underline{H}} \underline{V}_i) - \text{Tri\_low}(\underline{V}_i^H \hat{\underline{H}}^H \hat{\underline{H}} \underline{V}_i)) \underline{V}_i^H,$$

where: i is an index for the plurality of iterations;
"$H$" is a conjugate transpose;
$\underline{V}_i$ is the first matrix for i-th iteration;
$\hat{\underline{H}}$ is the channel response matrix for the MIMO channel;
Tri_up ($\underline{M}$) is a matrix containing elements above a diagonal of $\underline{M}$;
Tri_low ($\underline{M}$) is a matrix containing elements below the diagonal of $\underline{M}$;
$\mu$ is a step size; and
$\underline{V}_{i+1}$ is the updated first matrix for the i-th iteration.

3. The method of claim 1, wherein the updating of the first matrix comprises:
   computing a second matrix based on the first matrix and the channel response matrix,
   computing an update matrix based on the first and second matrices, and
   updating the first matrix with the update matrix.

4. The method of claim 3, wherein the second matrix is computed based on the following equation:

$$\underline{Y} = \underline{V}_i^H \hat{\underline{H}}^H \hat{\underline{H}} \underline{V}_i,$$

where i is an index for the plurality of iterations;
"$H$" is a conjugate transpose;
$\underline{V}_i$ is the first matrix for i-th iteration;
$\hat{\underline{H}}$ is the channel response matrix for the MIMO channel; and
$\underline{Y}$ is the second matrix.

5. The method of claim 1, further comprising:
   orthogonalizing the eigenvectors in the updated first matrix.

6. The method of claim 5, wherein the orthogonalization of the eigenvectors in the updated first matrix is performed using QR factorization.

7. The method of claim 3, further comprising:
   ordering the eigenvectors in the updated first matrix based on diagonal elements of the second matrix; and
   orthogonalizing the ordered eigenvectors in the updated first matrix.

8. The method of claim 1, wherein the first matrix is initialized to an identity matrix.

9. The method of claim 1, wherein the first matrix is initialized with eigenvectors obtained for a prior transmission interval.

10. The method of claim 1, wherein the MIMO system utilizes orthogonal frequency division multiplexing (OFDM), and wherein a different first matrix of eigenvectors is computed for each of a plurality of subbands based on a channel response matrix obtained for the subband.

11. The method of claim 10, wherein a first matrix of eigenvectors for a first subband is initialized to a first matrix of eigenvectors computed for a second subband.

12. The method of claim 1, wherein the first matrix is updated for a predetermined number of iterations.

13. The method of claim 1, wherein the first matrix is updated for a variable number of iterations until a termination condition is encountered.

14. The method of claim 3, wherein the first matrix is updated for a variable number of iterations until a sum of squared magnitude of off-diagonal elements of the second matrix is less than a threshold.

15. The method of claim 1, further comprising:
   estimating a channel response for a first link of the MIMO channel to obtain the channel response matrix, and wherein the updated first matrix of eigenvectors is used for spatial processing for data transmission on a second link of the MIMO channel.

16. The method of claim 1, further comprising:
   estimating a channel response for a downlink of the MIMO channel to obtain the channel response matrix, and wherein the updated first matrix of eigenvectors is used for spatial processing for data transmission on an uplink of the MIMO channel.

17. The method of claim 1, further comprising:
   filtering a plurality of channel response matrices for a plurality of transmission intervals to obtain a filtered channel response matrix, and wherein the first matrix is updated based on the filtered channel response matrix.

18. The method of claim 1, further comprising:
   deriving a spatial filter matrix based on the updated first matrix of eigenvectors and the channel response matrix, wherein the spatial filter matrix is used for spatial matched filtering of a data transmission received via the MIMO channel.

19. The method of claim 1, wherein the first matrix and the channel response matrix contain complex-valued elements.

20. An apparatus in a multiple-input multiple-output (MIMO) communication system, comprising:
   a channel estimator operative to obtain a channel response matrix for a MIMO channel; and
   a first unit operative to
   initialize a first matrix of eigenvectors and to
   update the first matrix based on the channel response matrix, wherein the first matrix is updated for a plurality of iterations, and wherein eigenvectors in the updated first matrix are used for spatial processing to transmit data via the MIMO channel.

21. The apparatus of claim 20, wherein the first unit is operable to update the first matrix based on the following equation:

$$\underline{V}_{i+1}^H = \underline{V}_i^H + \mu \cdot (\mathrm{Tri\_up}(\underline{V}_i^H \hat{H}^H \hat{H} \underline{V}_i) - \mathrm{Tri\_low}(\underline{V}_i^H \hat{H}^H \hat{H} \underline{V}_i))\underline{V}_i^H,$$

where: i is an index for the plurality of iterations;
"$H$" is a conjugate transpose;
$\underline{V}_i$ is the first matrix for i-th iteration;
$\hat{H}$ is the channel response matrix for the MIMO channel;
Tri_up ($\underline{M}$) is a matrix containing elements above a diagonal of $\underline{M}$;
Tri_low ($\underline{M}$) is a matrix containing elements below the diagonal of $\underline{M}$;
$\mu$ is a step size; and
$\underline{V}_{i+1}$ is the updated first matrix for the i-th iteration.

22. The apparatus of claim 20, further comprising:
a second unit operative to orthogonalize the eigenvectors in the updated first matrix.

23. The apparatus of claim 22, wherein the first and second units are implemented by a digital signal processor.

24. The apparatus of claim 20, further comprising:
a third unit operative to derive a spatial filter matrix based on the updated first matrix and the channel response matrix.

25. The apparatus of claim 20, further comprising:
a filter operative to filter a plurality of channel response matrices for a plurality of transmission intervals and provide a filtered channel response matrix, and wherein the first matrix is updated based on the filtered channel response matrix.

26. The apparatus of claim 20, wherein the MIMO system utilizes orthogonal frequency division multiplexing (OFDM), and wherein a different first matrix of eigenvectors is computed for each of a plurality of subbands based on a channel response matrix obtained for the subband.

27. An apparatus in a multiple-input multiple-output (MIMO) communication system, comprising:
means for initializing a first matrix of eigenvectors; and
means for updating the first matrix based on a channel response matrix for a MIMO channel, wherein the first matrix is updated for a plurality of iterations, and wherein eigenvectors in the updated first matrix are used for spatial processing to transmit data via the MIMO channel.

28. The apparatus of claim 27, wherein the first matrix is updated based on the following equation:

$$\underline{V}_{i+1}^H = \underline{V}_i^H + \mu \cdot (\mathrm{Tri\_up}(\underline{V}_i^H \hat{H}^H \hat{H} \underline{V}_i) - \mathrm{Tri\_low}(\underline{V}_i^H \hat{H}^H \hat{H} \underline{V}_i))\underline{V}_i^H,$$

where: i is an index for the plurality of iterations;
"$H$" is a conjugate transpose;
$\underline{V}_i$ is the first matrix for i-th iteration;
$\hat{H}$ is the channel response matrix for the MIMO channel;
Tri_up ($\underline{M}$) is a matrix containing elements above a diagonal of $\underline{M}$;
Tri_low ($\underline{M}$) is a matrix containing elements below the diagonal of $\underline{M}$;
$\mu$ is a step size; and
$\underline{V}_{i+1}$ is the updated first matrix for the i-th iteration.

29. The apparatus of claim 27, further comprising:
means for orthogonalizing the eigenvectors in the updated first matrix.

30. The apparatus of claim 27, further comprising:
means for deriving a spatial filter matrix based on the updated first matrix and the channel response matrix.

31. The apparatus of claim 27, further comprising:
means for filtering a plurality of channel response matrices for a plurality of transmission intervals to obtain a filtered channel response matrix, and wherein the first matrix is updated based on the filtered channel response matrix.

32. The apparatus of claim 27, wherein the means for updating of the first matrix comprises:
means for computing a second matrix based on the first matrix and the channel response matrix,
means for computing an update matrix based on the first and second matrices, and
means for updating the first matrix with the update matrix.

33. The apparatus of claim 32, wherein the second matrix is computed based on the following equation:

$$\underline{Y} = \underline{V}_i^H \hat{H}^H \hat{H} \underline{V}_i,$$

where: i is an index for the plurality of iterations;
"$H$" is a conjugate transpose;
$\underline{V}_i$ is the first matrix for i-th iteration;
$\hat{H}$ is the channel response matrix for the MIMO channel; and
$\underline{Y}$ is the second matrix.

34. The apparatus of claim 29, wherein the means for orthogonalization of the eigenvectors in the updated first matrix is performed using QR factorization.

35. The apparatus of claim 32, further comprising:
means for ordering the eigenvectors in the updated first matrix based on diagonal elements of the second matrix; and
means for orthogonalizing the ordered eigenvectors in the updated first matrix.

36. The apparatus of claim 27, wherein the first matrix is initialized to an identity matrix.

37. The apparatus of claim 27, wherein the first matrix is initialized with eigenvectors obtained for a prior transmission interval.

38. The apparatus of claim 27, wherein the MIMO system utilizes orthogonal frequency division multiplexing (OFDM), and wherein a different first matrix of eigenvectors is computed for each of a plurality of subbands based on a channel response matrix obtained for the subband.

39. The apparatus of claim 38, wherein a first matrix of eigenvectors for a first subband is initialized to a first matrix of eigenvectors computed for a second subband.

40. The apparatus of claim 27, wherein the first matrix is updated for a predetermined number of iterations.

41. The apparatus of claim 27, wherein the first matrix is updated for a variable number of iterations until a termination condition is encountered.

42. The apparatus of claim 32, wherein the first matrix is updated for a variable number of iterations until a sum of squared magnitude of off-diagonal elements of the second matrix is less than a threshold.

43. The apparatus of claim 27, further comprising:
means for estimating a channel response for a first link of the MIMO channel to obtain the channel response matrix, and wherein the updated first matrix of eigenvectors is used for spatial processing for data transmission on a second link of the MIMO channel.

44. The apparatus of claim 27, further comprising:
means for estimating a channel response for a downlink of the MIMO channel to obtain the channel response matrix, and wherein the updated first matrix of eigenvectors is used for spatial processing for data transmission on an uplink of the MIMO channel.

45. The apparatus of claim 27, wherein the first matrix and the channel response matrix contain complex-valued elements.

46. A computer-program product for computation of eigenvectors in a multiple-input multiple-output (MIMO) communication system comprising a computer readable medium having a set of instructions stored thereon, the set of instructions being executable by one or more processors and the set of instructions comprising:
   instructions for initializing a first matrix of eigenvectors; and
   instructions for updating the first matrix based on a channel response matrix for a MIMO channel, wherein the first matrix is updated for a plurality of iterations, and wherein eigenvectors in the updated first matrix are used for spatial processing to transmit data via the MIMO channel.

47. The computer-program product of claim 46, wherein the first matrix is updated based on the following equation:

$$\underline{V}_{i+1}^H = \underline{V}_i^H + \mu \cdot (\text{Tri\_up}(\underline{V}_i^H \hat{\underline{H}}^H \hat{\underline{H}} \underline{V}_i) - \text{Tri\_low}(\underline{V}_i^H \hat{\underline{H}}^H \hat{\underline{H}} \underline{V}_i))\underline{V}_i^H,$$

where: i is an index for the plurality of iterations;
   "H" is a conjugate transpose;
   $\underline{V}_i$ is the first matrix for i-th iteration;
   $\hat{\underline{H}}$ is the channel response matrix for the MIMO channel;
   Tri_up ($\underline{M}$) is a matrix containing elements above a diagonal of $\underline{M}$;
   Tri_low ($\underline{M}$) is a matrix containing elements below the diagonal of $\underline{M}$;
   $\mu$ is a step size; and
   $\underline{V}_{i+1}$ is the updated first matrix for the i-th iteration.

48. The computer-program product of claim 46, wherein the instructions for updating of the first matrix comprises:
   instructions for computing a second matrix based on the first matrix and the channel response matrix,
   instructions for computing an update matrix based on the first and second matrices, and
   instructions for updating the first matrix with the update matrix.

49. The computer-program product of claim 48, wherein the first matrix is updated for a variable number of iterations until a sum of squared magnitude of off-diagonal elements of the second matrix is less than a threshold.

50. The computer-program product of claim 48, wherein the second matrix is computed based on the following equation:

$$\underline{Y} = \underline{V}_i^H \hat{\underline{H}}^H \hat{\underline{H}} \underline{V}_i,$$

where: i is an index for the plurality of iterations;
   "H" is a conjugate transpose;
   $\underline{V}_i$ is the first matrix for i-th iteration;
   $\hat{\underline{H}}$ is the channel response matrix for the MIMO channel; and
   $\underline{Y}$ is the second matrix.

51. The computer-program product of claim 48, further comprising:
   instructions for ordering the eigenvectors in the updated first matrix based on diagonal elements of the second matrix; and
   instructions for orthogonalizing the ordered eigenvectors in the updated first matrix.

52. The computer-program product of claim 46, further comprising:
   instructions for orthogonalizing the eigenvectors in the updated first matrix.

53. The computer-program product of claim 52, wherein the instructions for orthogonalization of the eigenvectors in the updated first matrix is performed using QR factorization.

54. The computer-program product of claim 46, wherein the first matrix is initialized to an identity matrix.

55. The computer-program product of claim 46, wherein the first matrix is initialized with eigenvectors obtained for a prior transmission interval.

56. The computer-program product of claim 46, wherein the MIMO system utilizes orthogonal frequency division multiplexing (OFDM), and wherein a different first matrix of eigenvectors is computed for each of a plurality of subbands based on a channel response matrix obtained for the subband.

57. The computer-program product of claim 56, wherein a first matrix of eigenvectors for a first subband is initialized to a first matrix of eigenvectors computed for a second subband.

58. The computer-program product of claim 46, wherein the first matrix is updated for a predetermined number of iterations.

59. The computer-program product of claim 46, wherein the first matrix is updated for a variable number of iterations until a termination condition is encountered.

60. The computer-program product of claim 46, further comprising:
   instructions for estimating a channel response for a first link of the MIMO channel to obtain the channel response matrix, and wherein the updated first matrix of eigenvectors is used for spatial processing for data transmission on a second link of the MIMO channel.

61. The computer-program product of claim 46, further comprising:
   instructions for estimating a channel response for a downlink of the MIMO channel to obtain the channel response matrix, and wherein the updated first matrix of eigenvectors is used for spatial processing for data transmission on an uplink of the MIMO channel.

62. The computer-program product of claim 46, further comprising:
   instructions for filtering a plurality of channel response matrices for a plurality of transmission intervals to obtain a filtered channel response matrix, and wherein the first matrix is updated based on the filtered channel response matrix.

63. The computer-program product of claim 46, farther comprising:
   instructions for deriving a spatial filter matrix based on the updated first matrix and the channel response matrix.

64. The computer-program product of claim 46, wherein the first matrix and the channel response matrix contain complex-valued elements.

65. The apparatus of claim 20, wherein the first unit is farther operative to update the first matrix by:
   computing a second matrix based on the first matrix and the channel response matrix,
   computing an update matrix based on the first and second matrices, and
   updating the first matrix with the update matrix.

66. The apparatus of claim 65, wherein the second matrix is computed based on the following equation:

$$\underline{Y} = \underline{V}_i^H \hat{\underline{H}}^H \hat{\underline{H}} \underline{V}_i,$$

where: i is an index for the plurality of iterations;
"$H$" is a conjugate transpose;
$\underline{V}_i$ is the first matrix for i-th iteration;
$\hat{\underline{H}}$ is the channel response matrix for the MIMO channel; and
$\underline{Y}$ is the second matrix.

67. The apparatus of claim 22, wherein the second unit further operative to orthogonalize the eigenvectors in the updated first matrix by using QR factorization.

68. The apparatus of claim 65, wherein the first unit is further operative to:
  order the eigenvectors in the updated first matrix based on diagonal elements of the second matrix; and
  orthogonalize the ordered eigenvectors in the updated first matrix.

69. The apparatus of claim 20, wherein the first unit initializes the first matrix to an identity matrix.

70. The apparatus of claim 20, wherein the first unit initializes the first matrix with eigenvectors obtained for a prior transmission interval.

71. The apparatus of claim 20, wherein the MIMO system utilizes orthogonal frequency division multiplexing (OFDM), and wherein a different first matrix of eigenvectors is computed for each of a plurality of subbands based on a channel response matrix obtained for the subband.

72. The apparatus of claim 71, wherein the first unit initializes a first matrix of eigenvectors for a first subband to a first matrix of eigenvectors computed for a second subband.

73. The apparatus of claim 20, wherein the first unit updates the first matrix for a predetermined number of iterations.

74. The apparatus of claim 20, wherein the first unit updates the first matrix for a variable number of iterations until a termination condition is encountered.

75. The apparatus of claim 65, wherein the first unit updates the first matrix for a variable number of iterations until a sum of squared magnitude of off diagonal elements of the second matrix is less than a threshold.

76. The apparatus of claim 20, wherein the first matrix and the channel response matrix contain complex-valued elements.

* * * * *